United States Patent [19]

Takahashi et al.

[11] Patent Number: 4,984,115
[45] Date of Patent: Jan. 8, 1991

[54] ROTARY ACTUATOR AND BEARING SUPPORT THEREFOR

[75] Inventors: Tsuyoshi Takahashi; Katsumi Kawamura; Jun Naruse; Jyousei Shimizu, all of Odawara, Japan

[73] Assignee: Hitachi, Ltd., Tokyo, Japan

[21] Appl. No.: 374,832

[22] Filed: Jul. 3, 1989

Related U.S. Application Data

[63] Continuation of Ser. No. 943,750, Dec. 19, 1986, Pat. No. 4,892,423.

[30] Foreign Application Priority Data

Dec. 23, 1985 [JP] Japan .................................. 60-287703

[51] Int. Cl.$^5$ .............................................. G11B 5/55
[52] U.S. Cl. .................................. 360/106; 360/99.08
[58] Field of Search .............. 360/97.03, 98.07, 99.03, 360/99.04, 99.08, 106; 384/611–613

[56] References Cited

U.S. PATENT DOCUMENTS 4,480,881 11/1984 Fujimori ........................ 384/613 X
4,713,703 12/1987 Asano ............................ 360/99.08

FOREIGN PATENT DOCUMENTS 55-157166 12/1980 Japan ............................ 360/99.08

Primary Examiner—A. J. Heinz
Attorney, Agent, or Firm—Antonelli, Terry, Stout & Kraus

[57] ABSTRACT

An axial force exerting in the axial direction of a rotary actuator is uniformly applied to a plurality of axially arranged ball bearings of a bearing set to hold inner and outer rings of each ball bearing in optimum position, thereby heightening the rigidity of the bearing set. A waved washer is interposed between the ball bearings and distributes the axial force so as to axially slide the ball bearings. While being slidden to the optimum positions, the ball bearings are bonded for fixing.

8 Claims, 5 Drawing Sheets

ROTARY ACTUATOR AND BEARING SUPPORT THEREFOR

This is a continuation of application Ser. No. 943,750, filed Dec. 19, 1986 now U.S. Pat. No. 4,892,423.

BACKGROUND OF THE INVENTION

This invention relates to a rotary actuator using ball bearings and more particularly to this type of rotary actuator suitable for use in a rotary disc storage device.

JP-A-No. 60-102862 published on June 7, 1985 discloses a rotary actuator comprising bearing sets each having a plurality of ball bearings. The shaft structure of the rotary actuator can be simplified and manufactured at low costs by using the rotary actuator the rotational shaft of which is supported at its upper and lower ends by a ball bearing as in the above publication. But the rigidity of the single ball bearing at the both ends is small in the radial direction, resulting in a low mechanical resonance frequency of a rotary part of the rotary actuator. Consequently, vibrations are liable to be induced in the servo control process to degrade accuracy of positioning of a magnetic head on a magnetic disc. In another rotary actuator, its rotational shaft is supported at upper and lower ends by needle bearings for the purpose of improving radial rigidity. Since the radial rigidity of the needle bearing is large, a rotary part of the rotary actuator can have a high mechanical resonance frequency and is not liable to induce vibrations in the servo control. Disadvantageously, however, this rotational shaft has a complicated shape and requires additional thrust bearings, thus leading to expensiveness.

SUMMARY OF THE INVENTION

An object of this invention is to provide a mechanical arrangement wherein inner and outer rings of each ball bearing of a bearing set are in uniform contact with all of the balls arranged side by side throughout the circumference of the rings to increase rigidity of the bearing set even when ball bearings of the standard specification are used for the bearing set, thereby making it possible to rigidly support the rotational shaft of the rotary actuator.

Another object of this invention is to make a rotary part of the rotary actuator having a high resonance frequency which is not liable to induce vibrations in the servo control and thus to provide an inexpensive magnetic disc device capable of accurate positioning of the magnetic head.

Still another object of this invention is to provide a mechanical structure which can effectively heighten the radial rigidity, without resort to the additional provision of needle bearings and thrust bearings, by using inexpensive ball bearings of the standard specification which are commensurate with a simplified shape of rotational shaft.

Yet still another object of this invention is to provide a mechanical structure which can realize a high-rigidity ball bearing set by uniformly distributing a load applied on the shaft of the rotary actuator to a plurality of ball bearings.

According to the invention, the shaft of the rotary actuator is supported by at least one bearing set comprised of a plurality of ball bearings having respective outer rings which are laminated through an in-between spacing and respective inner rings which are laminated through the medium of an in-between elastic member. Each ball bearing, though being an inexpensive ball bearing of non-special specification, has its inner and outer rings which are uniformly urged against all of the balls so that the bearing set exhibit high rigidity in the radial direction.

DESCRIPTION OF THE PREFERRED EMBODIMENTS

Figure 1:
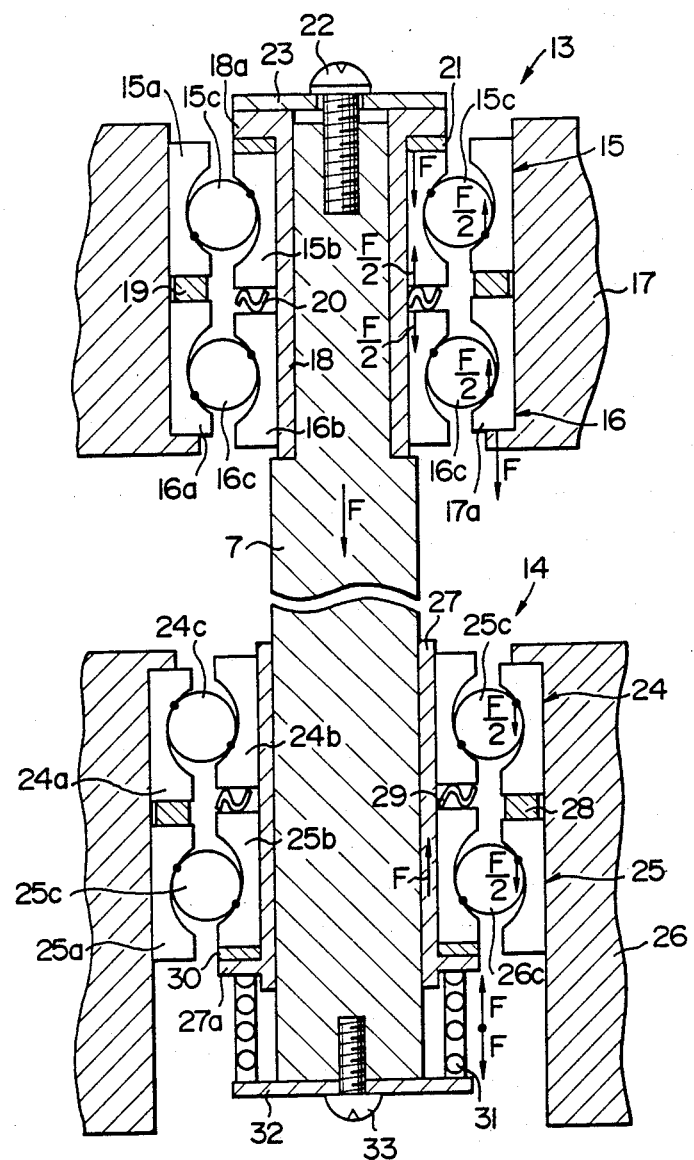
FIG. 1 is an enlarged sectional view showing a bearing structure, which stands for an essential part of a magnetic disc device, according to an embodiment of the invention.
Figure 2:
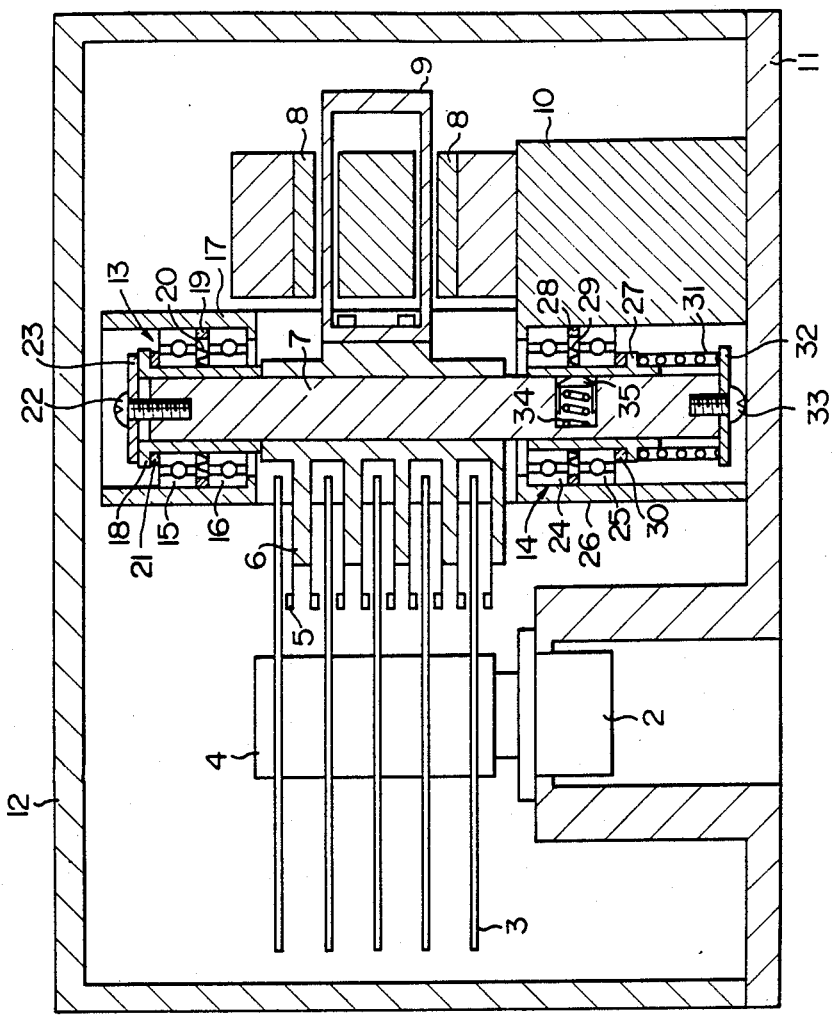
FIG. 2 is a longitudinal sectional view showing an embodiment of a magnetic disc device of the invention.

FIG. 1 shows a bearing structure used for the rotational shaft of a rotary actuator illustrated in FIG. 2.

As shown in FIG. 2, a magnetic disc device 1 incorporating this bearing structure comprises a spindle 4 directly coupled to a motor 2 and supporting a plurality of magnetic discs 3 for rotation, a rotary actuator 10 which has a rotational shaft 7 for supporting head arms 6 respectively having magnetic heads 5 at their tip ends and which is driven by a voice coil motor comprised of magnets 8 and a coil 9 to rotate the magnetic heads 5, a base 11 for supporting these components, and a cover 12 for enclosure of the above components. When the rotary actuator 10 is driven, the head arms 6 are rotated together with the rotational shaft 7 so that the magnetic heads 5 can be positioned at desired tracks on the magnetic discs 3 which are driven by the motor 2 to rotate on. This positioning operation is performed through servo control.

The bearing structure for the shaft 7 is best seen in FIG. 1.

The shaft 7 has an upper end supported by a bearing set 13 and a lower end supported by a bearing set 14. Each of the bearing sets 13 and 14 has substantially the same construction and is subjected to bonding for assemblage under a spring bias as will be described later.

The upper bearing set 13 has two laminated ball bearings 15 and 16. These ball bearings 15 and 16 are not of high accuracy pursuant to a special specification but they are ordinary ones. Outer rings 15a and 16a of the respective ball bearings 15 and 16 are bonded to a cylindrical housing 17 and their inner rings 15b and 16b are bonded to a sleeve 18 which is axially slidably fitted on the shaft 7. The outer rings 15a and 16a clamp or sandwich an in-between annular spacer 19 having a thickness of $t_1$ and the inner rings 15b and 16b clamp or sandwich an in-between waved or sinuous washer 20. The waved or sinuous washer 20 is a resilient ring washer having three or more peaks. Thus, the waved or sinuous washer 20 forms an elastic member of a substantially circular configuration having a plane in which a plurality of alternate peaks and valleys perpendicularly intersect. Sandwiched between the inner ring 15b and a flange 18a of the sleeve 18 is a rubber ring 21. The sleeve 18 is secured to the shaft 7 by means of a screw 22 and a washer 23.

The lower bearing set 14 has two laminated ball bearings 24 and 25 which are of the standard specification. Outer rings 24a and 25a of the respective ball bearings 24 and 25 are bonded to a cylindrical housing 26 and their inner rings 24b and 25b are bonded to a sleeve 27 which is slidably fitted on the shaft 7. A spacer 28 is sandwiched between the outer rings 24a and 25a, a waved washer 29 is sandwiched between the inner rings 24b and 25b, and a rubber ring 30 is sandwiched between the inner ring 25b and a flange 27a of the sleeve 27. The rubber ring 30 may be replaced by other elastic member.

A thrust spring 31 is applied about a lower end portion of the shaft 7 by means of an end plate 32 and a screw 33. This spring 31 exerts on the shaft 7 a force F which urges it downwards and on the sleeve 27 an opposite force F which urges it upwards.

The bearing set 13 is assembled in a manner as described below.

For assemblage, dimensions of the ball bearings 15 and 16, housing 17 and sleeve 18 are so set as to enable the outer rings 15a and 16a to loosely fit in the housing with clearance and also to enable the inner rings 15b and 16b to loosely fit on the sleeve 18 with clearance. Thus, the fitting of the outer rings 15a and 16a in the housing 17 has a play and these outer rings are appreciably movable along the housing 17. Similarly, the fitting of the inner rings 15b and 16b on the sleeve 18 has a play and these inner rings are appreciably movable along the sleeve 18. The outer circumferential surfaces of the outer rings 15a and 16a are coated with a thermosetting adhesive and the inner circumferential surfaces of the inner rings 15b and 16b are coated with the same adhesive. Then, the ball bearings 15 and 16 having their outer and inner rings coated with the adhesive, the spacer 19, the waved washer 20 and the rubber ring 21 are put together, thus completing temporary assemblage.

In the temporary assembly, the force F urging the shaft 7 downwards is exerted on the inner ring 15b of the ball bearing 15 through the flange 18a and rubber ring 21. This force F exerting on the inner ring 15b is transmitted to the outer ring 15a through a ball 15c to urge the outer ring 15a downwards. Consequently, the spacer 19 and the outer ring 16a of the ball bearing 16 are urged downwards and the bottom surface of the outer ring 16a is urged by the force F against a reference surface 17a of the housing 17 to make intimate contact therewith. Thus, the posture of the outer ring 16a is controlled by the reference surface 17a. With the spacer 19 being in close contact with the outer ring 16a, the outer ring 15a makes intimate contact with the upper surface of the spacer 19 for its posture control. Since the outer rings 15a and 16a are in intimate contact with each other with the spacer 19 sandwiched therebetween, the waved washer 20 sandwiched between the inner rings 15b and 16b is deformed elastically to urge the inner ring 15b upwards and the inner ring 16b downwards. Geometrical dimensions of the waved washer 20 are determined such that when the waved washer 20 is compressed to a thickness equal to the thickness $t_1$ of the spacer 19, a force of $\frac{1}{2}$ F is generated by the waved washer 20. The $\frac{1}{2}$ F force generated by the waved washer 20 is representative of upward and downward component forces exerting on the inner rings 15b and 16b, respectively.

The upper inner ring 15b therefore opposes the downward force F and is urged upwards by a force $F - F/2 (= F/2)$ while the lower inner ring 16b is urged downwards by the F/2 force.

The upper inner ring 15b deforms the rubber ring 21 accordingly and takes the posture of uniformly urging against all of the balls 15c. Consequently, the upper inner ring 15b is held in position by the outer ring 15a through the medium of all of the balls 15c. Similarly, the lower inner ring 16b deforms the waved washer 20 accordingly and takes the posture of uniformly urging against all of balls 16c so as to be held in position by the outer ring 16a through the medium of all of the balls 16c.

In this way, the upper ball bearing 15 has the outer and inner rings 15a and 15b which uniformly urge against all of the plural balls 15c arranged side by side throughout the circumference of these rings and the lower ball bearing 16 also has the outer and inner rings 16a and 16b which uniformly urge against all of the plural balls 16c arranged side by side throughout the circumference of these rings.

Under the temporary assembly condition, the adhesive is heated for setting to the end that the outer rings 15a and 16a are bonded to the housing 17 and the inner rings 15b and 16b are bonded to the sleeve 18, thereby completing the bearing set 13.

In the thus assembled bearing set 13, the ball bearing 15 has the outer and inner rings 15a and 15b which are in uniform contact with all of the plural balls 15c arranged side by side throughout the circumference of these rings and the ball bearing 16 likewise has the outer and inner rings 16a and 16b which are in uniform contact with all of the plural balls 16c arranged side by side throughout the circumference of these rings, thus making it possible to heighten the radial rigidity of the bearing set 13. In effect, thanks to the laminated ball bearings 15 and 16, the radial rigidity of the bearing set 13 is comparable to that of a bearing set typically applicable to machine tools which is fabricated by using two ball bearings in back to back, face to face or parallel combination pursuant to a special specification, and the shaft 7 can be supported rigidly by the bearing set 13.

Due to the fact that the inner and outer rings of each of the ball bearings 15 and 16 are bonded for fixing while being loaded with the equal force (F/2) for urging against the balls, the ball bearings 15 and 16 can equally share a load applied on the shaft, thus having an equal life. Accordingly, the bearing set 13 can have a maximized life.

As will be seen from the foregoing description, the spacer 19, waved washer 20 and rubber ring 21 are indispensable members for assemblage but they do not play a particular role after bonding.

The lower bearing set 14 can be assembled in the same manner as that described previously, so that the outer and inner rings 24a and 24b of the ball bearing 24 are bonded to the housing 26 and the sleeve 7 while being in uniform contact with all balls 24c and the outer and inner rings 25a and 25b of the ball bearing 25 are bonded to the housing 26 and sleeve 27 while being in uniform contact with all balls 25c, thereby heightening the radial rigidity of the bearing set 14.

The rotational shaft 7 can be supported rigidly at its upper and lower end portions by the bearing sets 13 and 14 to enable the rotary part of the rotary actuator 10 to have a high mechanical resonance frequency which is not liable to induce vibrations in the servo control and therefore the magnetic head 5 can be held in position with high accuracy. In addition, the shaft 7 can be simplified in shape thanks to the use of the ball bearings, and the bearing structure can be inexpensive because the additional provision of thrust bearings is not needed and the ball bearing of the standard specification suffices.

As particularly shown in FIG. 2, a spring 34 operating in the radial direction and a pusher 35 are built in a lower portion of the shaft 7. Under the application of a spring force of the spring 34, the pusher 35 urges the sleeve 27 in the radial direction to radially offset the same. This eliminate the adverse influence of a play between the shaft 7 and the sleeve 27.

Figure 3:
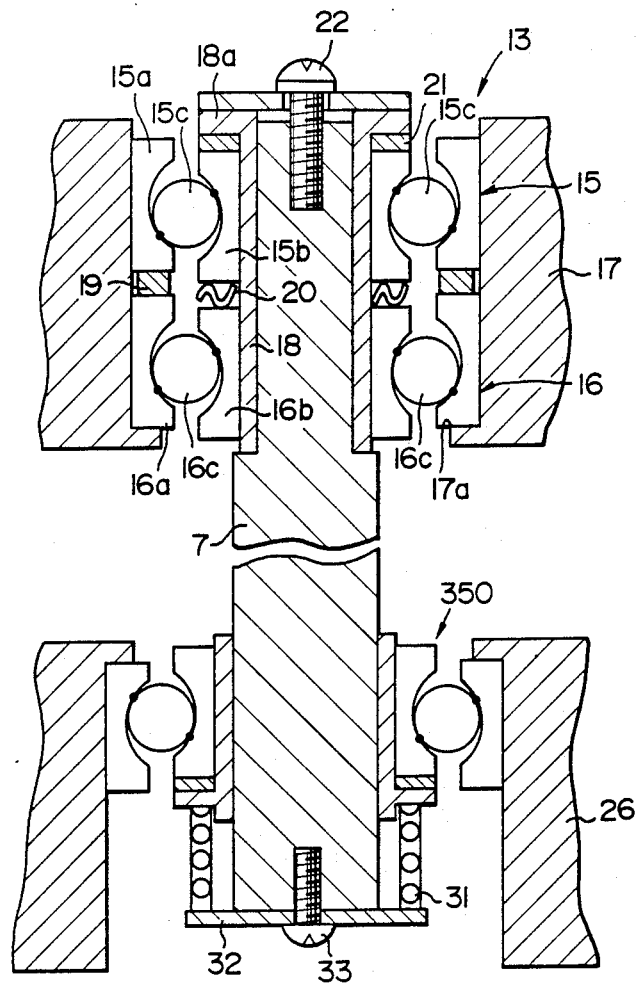
FIG. 3 is a sectional view showing a bearing structure for use with the rotational shaft of a rotary actuator according to another embodiment of the invention.

FIG. 3 illustrates a modified embodiment of the invention. In FIG. 3, members like those shown in FIG. 1 are denoted by like reference characters and will not be described. In this modification, the shaft 7 is supported at its upper end by the same bearing set 13 as that of FIG. 1 and at its lower end by a single ball bearing 350. The device construction shown in FIG. 2 clearly indicates that the bearing structure is carried on the base 11 of large weight and so the amplitude of unwanted vibration at the lower end portion is smaller than the amplitude of vibration at the upper end portion. Therefore, only the upper bearing set 13 may preferably be incorporated with the component force distributing configuration based on the waved washer 20 to reduce the cost effectively.

Figure 4:
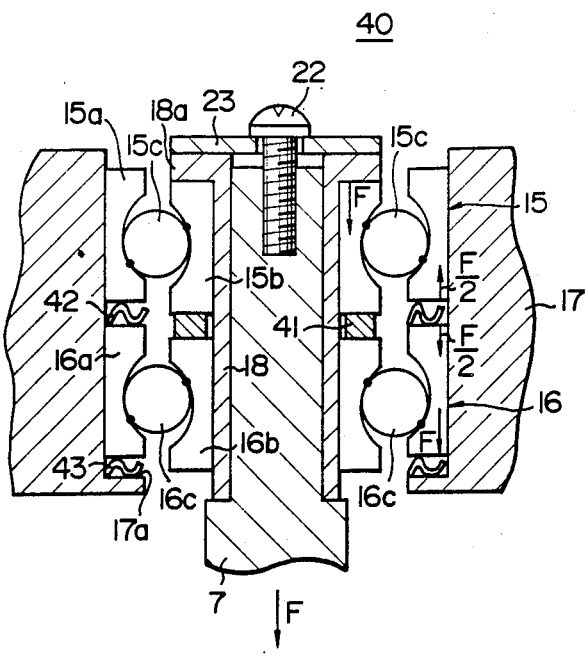
FIGS. 4 to 6 are fregmentary sectional views showing bearing structures according to further embodiments of the invention.

The essential part of another embodiment of bearing structure according to the invention is illustrated in FIG. 4 in which components like those of FIG. 1 are designated by like reference characters for avoidance of prolixity of explanation. A bearing set 40 has inner rings 15b and 16b which are postured to profile the shaft 7 and outer rings 15a and 16a which follow the inner rings 15b and 16b. For assemblage, the inner rings 15b and 16b are loosely fitted on the sleeve 18, with a spacer 41 corresponding to the spacer 19 of FIG. 1 sandwiched between these inner rings, and the outer rings 15a and 16a clamp an in-between waved washer 42 corresponding to the waved washer 20 of FIG. 1, with a waved washer 43 corresponding to the rubber ring 21 of FIG. 1 interposed between the outer ring 16a and the reference surface 17a of the housing 17. In this embodiment, the flange 18a of the sleeve 18 serves as a reference surface.

The force F urging the shaft 7 downwards urges the inner ring 15b, spacer 41 and inner ring 16b downwards so that the outer ring 16a is urged downwards through the medium of the balls 16c. The inner ring 15b urges against the flange 18a to take the controlled posture, the inner ring 16b is forced through the spacer 41 to take the controlled posture, and the outer ring 16a is forced through the balls 16c to take the controlled posture such that the outer ring 16a comes in uniform contact with all of the balls 16c. The outer ring 15a is urged upwards by the spring force (F/2) of the waved washer 42 so as to be forced through the balls 15c to take the controlled posture such that the outer ring 15a comes in uniform contact with all of the balls 15c. The inner rings 15b and 16b are bonded to the sleeve 18 while taking the controlled posture as above, and the outer rings 15a and 16a are bonded to the housing 17 while taking the controlled posture as above.

Thus, as in the precedence, the inner and outer rings of each of the ball bearings 15 and 16 are in uniform contact with all of the balls 15c or all of the balls 16c to heighten the radial rigidity of the bearing set 40. Consequently, the bearing set 40 can exhibit rigidity comparable to that of the bearing set 13.

In the foregoing embodiments, each of the bearing sets 13, 14 and 40 has two laminated ball bearings but three or more ball bearings may be laminated as necessary and the rigidity can be more heightened as the number of the ball bearings increases.

Figure 5:
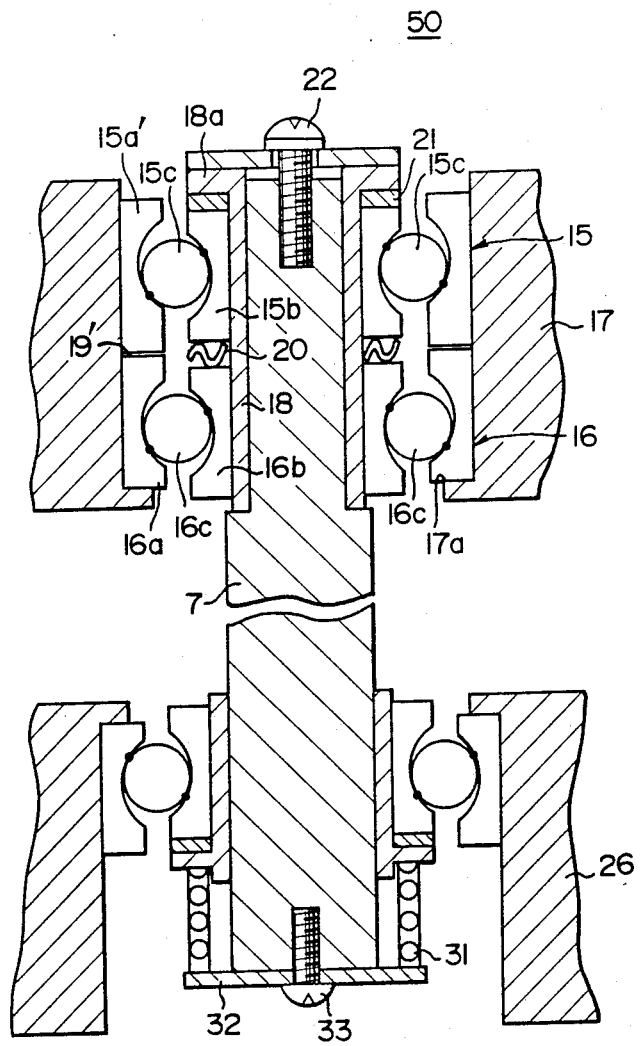

Referring to FIG. 5, there is illustrated still another embodiment of bearing structure wherein one of the ball bearings of a bearing set has an outer ring which is prolonged in the axial direction. This embodiment of FIG. 5 is advantageous in that the spacer 19 interposed between the outer rings 15a and 16a of the bearing set 13 shown in FIG. 3 and the spacer 41 interposed between the inner rings 15b and 16b shown in FIG. 4 can be dispensed with. Specifically, a bearing set 50 of the FIG. 5 embodiment includes a ball bearing 15 having an outer ring 15a' whose axial thickness or height is made larger than that of the inner ring 15b and of outer and inner rings 16a and 16b of a lower ball bearing 16, measuring a dimension that permits the outer ring 15a' to suppress the waved washer 20 until a repulsive force of waved washer 20 which opposes the force F applied by the thrust spring 31 to the bearing set through the shaft 7 grows to generate the predetermined force F and the distance 19' disappears.

Figure 6:
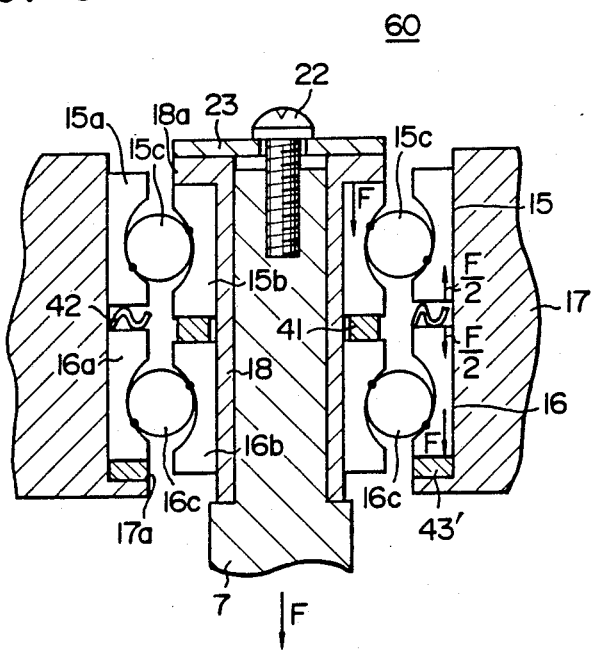

FIG. 6 illustrates a further embodiment of bearing set wherein an elastic member 43' is provided at the bottom of a set of axially arranged outer rings which clamp an in-between waved washer 42, whereby a load applied on the outer ring set can be transmitted to the reference surface 17a formed interiorly of the housing 17. As the elastic member 43', an ordinary rubber member may be used which can withstand the axial force F applied by the thrust spring 31. In this embodiment, the waved washer 43 of the FIG. 4 embodiment can be eliminated.

It will be appreciated that, in the foregoing embodiments, the upper ball bearing comprised of components 15a, 15b and 15c and the lower ball bearing comprised of components 16a, 16b and 16c are axially slidden, under the application of the repulsive force F of the waved washer 20 or 42, to positions where each of the ball bearings equally shares the component force F/2 generated by the waved washer and then each ball bearing is bonded to the housing at that position. In an example of bonding, a double-fluid admixed epoxy bonding agent is heated at 80° C. for a predetermined time and it is simply necessary for the waved washer 20, 42 or 43, spacer 19 or 41 and elastic member 43' to withstand the above heating condition. The thus assembled bearing set having the ball bearings bonded to the housing 17 at positions where they equally share the component force F/2 can fulfill its rigidity enhancing function for a long time.

Although the invention has been described by way of the magnetic disc device for the illustrative purpose, the present invention is not limited thereto but may be applied efficiently to construct a bearing set which is used for heightening the radial rigidity and suppressing unwanted vibrations in a rotary body such as an optical disc or an opto-magnetic disc.

We claim:
1. A rotary actuator comprising:
   a rotational shaft;
   a plurality of bearing sets arranged in spaced relationship along a longitudinal axis of said rotational shaft to support opposite ends of said rational shaft, each of said plurality of bearing sets including an outer ring and an inner ring which are concentric with respect to said rotational shaft, and a plurality of ball bearings interposed between said outer and inner rings;

an elastic member interposed between the respective inner rings of said plurality of bearing sets and having applied thereto a force in an axial direction of said rotational shaft, said elastic member being a substantially circular sinuous washer having a plane in which a plurality of alternate peaks and valleys perpendicularly intersect; and wherein said plurality of balls bearings are situated interiorly of a housing of said bearing set in the axial direction of said rotational shaft such that, under the application of an axial force, the ball bearings share substantially equally component forces generated by said elastic member.

2. A rotary actuator according to claim 1, wherein said elastic member is a substantially circular sinuous washer having a plane in which a plurality of alternate peaks and valleys perpendicularly intersect.

3. A rotary actuator having a head for recording and reproducing information in a disk device, the rotary actuator comprising:
a rotational shaft;
a plurality of bearing sets arranged in spaced relationship along the axis of said rotational shaft to support opposite ends of said rotational shaft, each of said plurality of bearing sets including an outer ring and an inner ring concentric with said rotational shaft, and a plurality of ball bearings interposed between said outer and inner rings and situated in interiorly of a housing;
an elastic member interposed between the respective inner rings of said plurality of bearing sets and having applied thereto a force in the axial direction of said rotational shaft to intervene in one of the sets of outer rings boded to said housing or of the inner rings bonded to said rotational shaft, and
a spacer member of a predetermined thickness intervening in the other set which opposes said one set, said predetermined thickness being of a geometrical dimension to define a gap between said spacer member and the other set, wherein said gap disappears when the axial force exerted on said elastic member reaches a predetermined value.

4. A rotary actuator according to claim 3, wherein said elastic member is a substantially circular sinuous washer having a plane in which a plurality of alternate peaks and valleys perpendicularly intersect.

5. A rotary actuator comprising:
a stationary housing;
a rotational shaft;
a plurality of bearing sets arranged in spaced relationship along the axis of said rotational shaft to support said rotational shaft at opposite ends thereof within said housing, each of said plurality of bearing sets including an outer ring and an inner ring which are concentric with said rotational shaft, and a plurality of ball bearings interposed between said outer and inner rings;

a sleeve slidably mounted between said rotational shaft and said inner ring of said ball bearing sets;
an elastic member interposed between the respective inner rings of said plurality of bearing sets for applying thereto a force in the axial direction of said rotational shaft;
wherein said plurality of ball bearing sets are arrayed in the axial direction of said rotational shaft such that, under the application of an axial force, said plurality of ball bearings substantially equally share component forces generated by said elastic member; and
wherein said inner ring of the respective ball bearing sets is bonded to said sleeve while said outer ring of the respective ball bearing sets is bonded to said housing in a state in which said axial force is applied.

6. A rotary actuator according to claim 5, wherein said elastic member intervenes in one of the sets of the outer rings and of the inner rings, a spacer member of a predetermined thickness intervenes in the other set which opposes said one set, said predetermined thickness being of a geometrical dimension permitting a gap between said spacer member and the other set to be zero when the axial force exerted on said elastic member through said one set reaches a predetermined value, and wherein said inner rings are bonded to said rotational shaft and said outer rings are bonded to said housing while said gap is zero.

7. A rotary actuator according to claim 5, wherein said elastic member is a substantially circular sinuous washer having a plane in which a plurality of alternate peaks and valleys perpendicularly intersect.

8. A rotary actuator comprising:
a plurality of bearing sets arranged in spaced relationship along the axis of said rotational shaft to support opposite ends of said rotational shaft, each of said plurality of bearing sets including an outer ring and an inner ring which are concentric with said rotational shaft, and a plurality of ball bearings interposed between said outer and inner rings;
an elastic member interposed between the respective inner rings of said plurality of bearing sets and having applied thereto a force in the axial direction of said rotational shaft;
said elastic member intervenes in one of the sets of the outer rings and of the inner rings, a spacer member of a predetermined thickness intervenes in the other set which opposes said one set, said predetermined thickness being of geometrical dimension permitting a gap between said spacer member and the other set to be zero when the axial force exerted on said elastic member through said one set reaches a predetermined value;
said plurality of ball bearings are situated interiorly of a housing of said bearing sets in the axial direction of said rotational shaft such that, under the application of an axial force, the ball bearings share substantially equally component forces generated by said elastic member; and
wherein said inner rings are bonded to said rotational shaft and said outer rings are bonded to said housing while said gap is zero.

* * * * *